United States Patent
Ashworth et al.

(10) Patent No.: US 6,481,287 B1
(45) Date of Patent: Nov. 19, 2002

(54) FLUID TEMPERATURE MEASUREMENT

(75) Inventors: Roger Philip Ashworth, Loughborough (GB); Mark Harper, Cambridge (GB)

(73) Assignee: BG Transco PLC, Reading (GB)

( * ) Notice: Subject to any disclaimer, the term of this patent is extended or adjusted under 35 U.S.C. 154(b) by 0 days.

(21) Appl. No.: 09/674,425

(22) PCT Filed: Apr. 21, 1999

(86) PCT No.: PCT/GB99/01209

§ 371 (c)(1),
(2), (4) Date: Feb. 15, 2001

(87) PCT Pub. No.: WO99/57530

PCT Pub. Date: Nov. 11, 1999

(30) Foreign Application Priority Data

May 2, 1998 (GB) .............................................. 9809375

(51) Int. Cl.[7] .............................................. G01K 11/22
(52) U.S. Cl. .......................... 73/597; 374/117; 374/119
(58) Field of Search ................ 374/119, 117; 73/627, 632, 584, 597, 602

(56) References Cited

U.S. PATENT DOCUMENTS

| | | | |
|---|---|---|---|
| 2,834,236 A | * | 5/1958 | Pardue et al. .................. 73/647 |
| 2,934,756 A | * | 4/1960 | Kalmus ....................... 342/127 |
| 3,137,169 A | * | 6/1964 | Clement et al. ............. 374/119 |
| 3,399,570 A | * | 9/1968 | Pirlet .......................... 374/119 |
| 3,501,956 A | * | 3/1970 | Yamaga et al. ............. 374/119 |
| 3,885,436 A | * | 5/1975 | Meyer ........................ 374/118 |
| 4,201,087 A | * | 5/1980 | Akita et al. .................. 374/119 |
| 4,215,575 A | * | 8/1980 | Akita et al. .................. 374/119 |
| 4,215,582 A | * | 8/1980 | Akita .......................... 374/119 |
| 4,817,615 A | * | 4/1989 | Fukukita et al. ............. 600/438 |
| 4,848,924 A | * | 7/1989 | Nuspl et al. ................. 374/119 |
| 5,214,955 A | * | 6/1993 | Yost et al. .................. 73/24.05 |
| 5,360,268 A | * | 11/1994 | Hayashi et al. ............. 374/117 |

* cited by examiner

Primary Examiner—Hezron Williams
Assistant Examiner—Charles D. Garber
(74) Attorney, Agent, or Firm—William H. Holt

(57) ABSTRACT

An acoustic temperature measurement system for pipeline fluids comprises a loudspeaker (16) with spaced microphone (18) in a sealed pipe (10) with end cap (11). A computer arrangement (22) provides a tone burst signal which drives the speaker via power amplifier (21) and the outgoing and reflected signal is detected by the microphone (18) and following amplification in amplifier (20) passes to the computer (22) for processing. The signals are processed to determine phase relationships indicative of temperature and can be used in correcting leakage measurement readings.

19 Claims, 5 Drawing Sheets

FLUID TEMPERATURE MEASUREMENT

The Invention Relates to Fluid Temperature Measurement.

In fluid carrying pipelines it is advantageous to determine if fluid leakage is occurring and to determine the amount of leakage. In gas pipelines for example it is desirable to be able to measure any leakage, which can be of a very small magnitude, over a pipeline of several kilometres.

Typically the test involves applying air to an empty pipeline at a pressure of 1.5 times the maximum working pressure of the gas main. The pressure is then monitored over several days or more to see if any pressure drop occurs during this period. If a pressure drop reading indicative of leakage of more than 0.0028 scmh (0.1 scfh) is established, then further investigation is indicated in order to determine the source of leak. In practice the pressure drop may not only occur as a result of leaks, but may vary due to temperature and pipe volume changes. This is particularly true for long pipelines where the pressure drop may be so small that the test period has to be extended over several weeks.

To provide a more effective pressure test it would also be necessary to determine the pipe volume changes over such a long period and the temperature changes in the fluid.

The volume may change in polyethylene pipes due to creep and a mechanism for dealing with creep is the subject of our earlier patent application.

The present invention is concerned with temperature aspects.

According to the invention there is provided a fluid temperature measurement system comprising:

transducer means for generating an acoustic signal for passage through the fluid; detector means for detecting a first signal as the acoustic signal passes through the fluid to a first position; detector means for detecting a second signal as the acoustic signal passes through the fluid to a second position; and processor means for calculating temperature as a result of information derived from the first and second detected signals.

Further according to the invention there is provided a method of temperature measurement in a fluid comprising:

generating an acoustic signal for passage through the fluid; detecting a first signal as the acoustic signal passes through the fluid to a first position; detecting a second signal as the acoustic signal passes through the fluid to a second position: and calculating temperature as a result of information derived from the first and second detected signals.

Still further according to the invention there is provided a pipe leak measurement apparatus comprising: means for detecting fluid pressure within a pipe over a selected period, means for measuring the temperature of the fluid with the pipe over a selected time period, and means for compensating for temperature changes of the fluid to provide a corrected fluid pressure measurement over the selected period to indicate the degree of pressure loss that would have occurred during the selected time period if temperature did not vary.

Still further according to the invention there is provided a method of pipe leak measurement comprising: applying a source of pressure to the sealed pipe, detecting fluid pressure within the pipe over a selected period, measuring the temperature of the fluid within the pipe over a selected time period, and compensating for temperature changes of the fluid to provide a corrected fluid pressure measurement over the selected period to indicate the degree of pressure loss which would have occurred if temperature had remained constant during the selected time period.

The invention will now be described by way of example with reference to the accompanying drawings in which.

Figure 1:
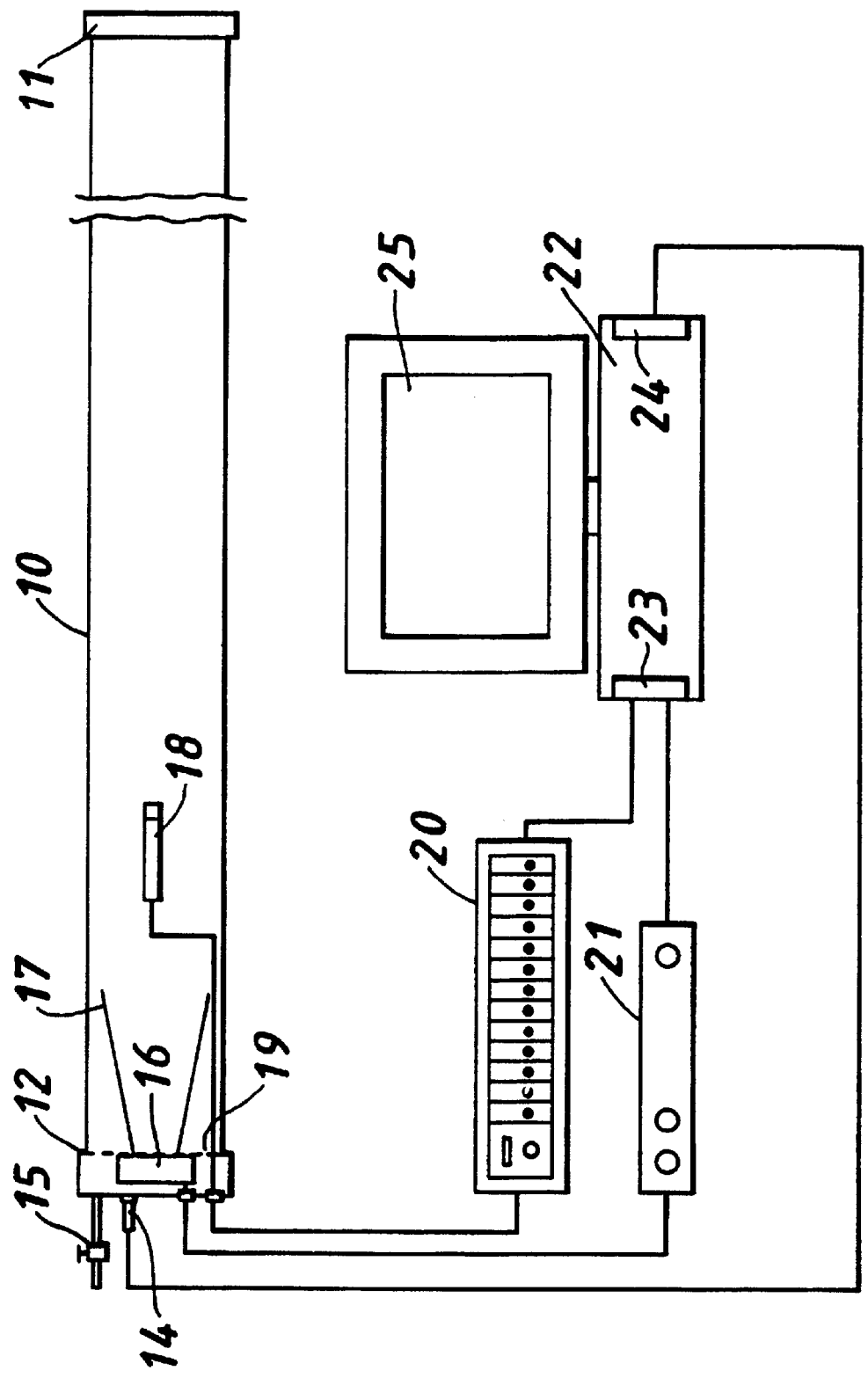
FIG. 1 shows an acoustic temperature measurement system for use on fluid pipelines.

The FIG. 1 arrangement is configured to pressurise the sealed pipe and to measure the temperature therein to assess leakage. The pipe 10 to be tested may be up to several kilometres in length and is terminated at one end by end cap 11.

At the other end of the pipe a housing 12 is attached to seal the pipe and to allow gas to be applied under pressure to the pipe by means of the valve 15.

The housing 12 includes a pressure transducer 14 for determining the pressure within the seal pipe to determine if this changes. Pressure equalisation vents 19 in the housing 12 allow the internal housing pressure to adjust to the pressure within the pipe 10. An acoustic source in the form of a loudspeaker 16 is provided on housing 12 and includes a compression driver with a horn 12 extending therefrom. The compression driver is capable of delivering an output level at least 100 dB with the linear acoustic horn.

A microphone 18, of the directional cardioid type, is positioned downstream of the loudspeaker 12, and it will receive both the originating acoustic output from the loudspeaker 12 and the resultant sound following reflection from the end 11 of the pipe 10, described in more detail below.

The microphone 18 output is received by differential amplifier 20 and passes to the digital signal processing board 23 within the computer 22.

The board 23 also generates the drive signal for the loudspeaker and this passes to power amplifier 21 to provide a signal of sufficient wattage to drive loudspeaker 16 output to travel down the pipe and reflect back again.

The pressure transducer 14 has its own internal interface to produce a digital output in a form that can communicate with the computer 22 via its serial communications port 25 (e.g. RS232). The absolute pressure measured can then be logged by computer 22 over a given period. Such information can be displayed on computer screen 24.

Figure 2:
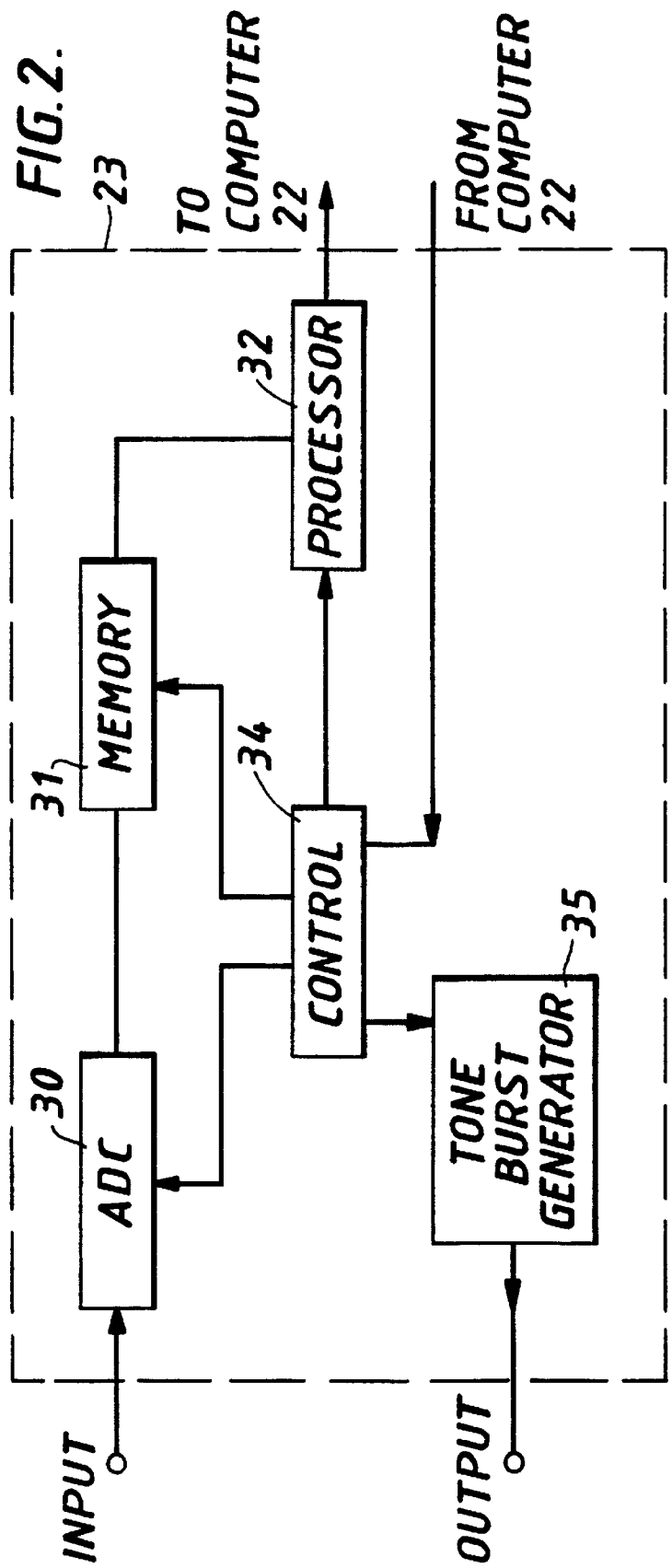
FIG. 2 shows a suitable processor board arrangement.

The processor board 23 is shown in more detail in FIG. 2.

The board comprises an analog to digital converter (ADC) 30 which receives the analog signal from the microphone 18 and converts this into digital form which is then stored in memory 31.

A tone burst generator 35 generates the output to drive the loudspeaker in the form of a single tone burst of several cycles which on transmission through the pipe 10 will be picked up by microphone 18 on its initial passage and thereafter on its return from the pipe end wall.

Both these sets of signals are captured and stored in memory in digital form. A processor 32 has access to this information and is configured to perform a fast fourier transform (FFT) analysis to calculate the relative phase between the two selected signal portions. The initial phase is stored as a reference for subsequent readings in the computer 22.

A control block 34 is connected to each of the devices (i.e. ADC 30, memory 31, tone burst generator 35 and processor 32). The control 34 can effect operational control under the prompting of the computer 22 which also receives the processed information.

The board 23 can process the data, carry out the windowing and perform the FFT and return the amplitude and phase spectra to the host PC 22.

The change in temperature is calculate by the differences ($\alpha\phi$) between initial ($-\phi_0$) and present phase ($\phi$) readings by the following:

$$\Delta\phi = \phi - \phi_0 \approx \frac{-360fL}{\sqrt{\gamma RT_0}}\left(\frac{T-T_0}{T_0}\right)$$

where:
- f is the drive frequency in Hz
- L is the pipe length in metres
- $\gamma$ is the ratio of specific heats (1.4)
- R is the specific gas constant (287 kJ/kg/degree K for air)
- T is the absolute temperature in degrees Kelvin (i.e. degrees C+273)

The signal path will be twice the pipe length and a relatively low mono frequency (e.g. less than 400 Hz) has proved satisfactory with bursts of up to 10 cycles. For extended lengths of mains pipe (up to 2 kM) the frequency may be selected to be as low as 20 Hz to provide the required distance range. (The product FL in the above equation illustrates that the accuracy is maintained at such frequencies).

Higher frequencies can give unwanted premature reflections resultant on pipe joints or fittings. Too low a frequency can cause noise level problems due to inherent background noise. The microphone 18 is positioned in the pipe at a specific distance in front of the loudspeaker 16 so as to maximise operation.

Typically the distance is chosen as equivalent to several pipe diameters, so that the waves are plane and the recorded levels are not affected by the local field near the source.

Using the above techniques, phase shifts of fractional parts of a degree are resolved and extremely accurate temperature change measurements to within 0.001° Celsius can be obtained.

In practice the frequency employed by the system for transmission by the transducer/loudspeaker is preferably selected dependent on the length of pipe to be tested to maximise range, taking into account temperature resolution factors and background noise levels.

Hence for a relatively short pipe length of 20 metres, a frequency of 1 KHz would be appropriate. A length of 100 metres could have a sound signal of 200 Hz. A length of 1 km could have a frequency set to 20 Hz for example.

Figure 3:
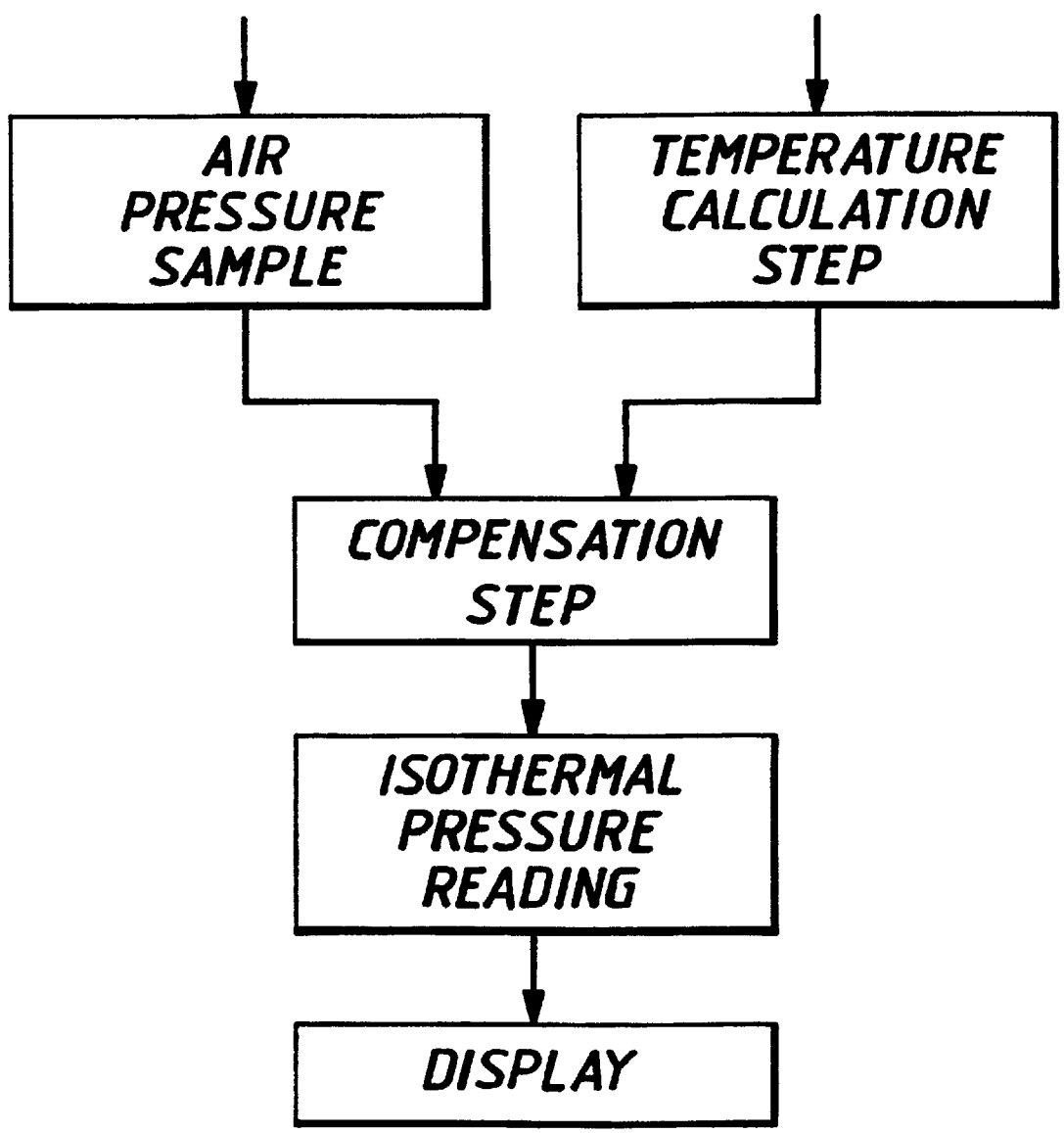
FIG. 3 shows computer compensation steps.

Whilst the temperature measurement is being carried out, the pressure transducer 14 is measuring the internal gas pressure in the pipe 10. The values received over time (e.g. several hours) by the computer 22 via serial port 24 need to be adjusted for temperature variation and the steps are shown in FIG. 3.

The air pressure sample together with the calculated temperature received by computer 22 is subject to a compensation step to give a resultant 'true' pressure reading for display and storage. The 'true' pressure corresponds to the pressure that would have been recorded in the absence of temperature variation.

This compensation can be carried out under software control.

Figure 4:
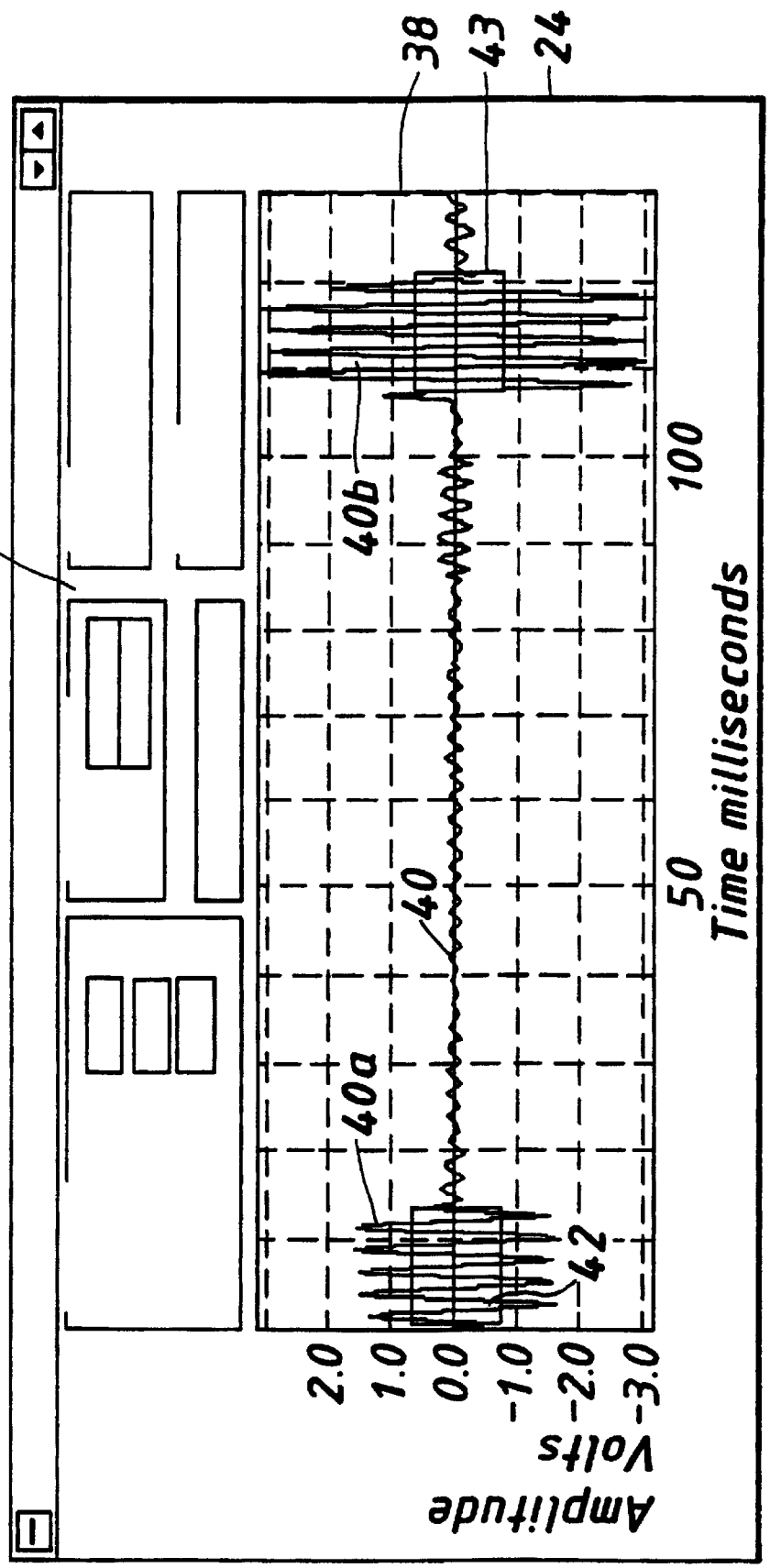
FIG. 4 shows monitored information on signal passage and the selection mechanism.

It is convenient to have an interactive mechanism using the computer screen to monitor incoming information and select and control displayed parameters. Such an arrangement is shown in FIG. 4.

The computer screen 24 is configured to show a graphical portion 38 and a text portion 39.

The graphical portion shows a representation of temperature 40 of the acoustic signal sent by the loudspeaker through the pipe. The amplitude is shown in volts and the time scale is milliseconds. A first portion 40a shows the tone burst received by the microphone on its passage through the gas in the pipe and the portion 40b represents the reflected tone burst received by the microphone following its reflection from the pipe wall.

Figure 5:
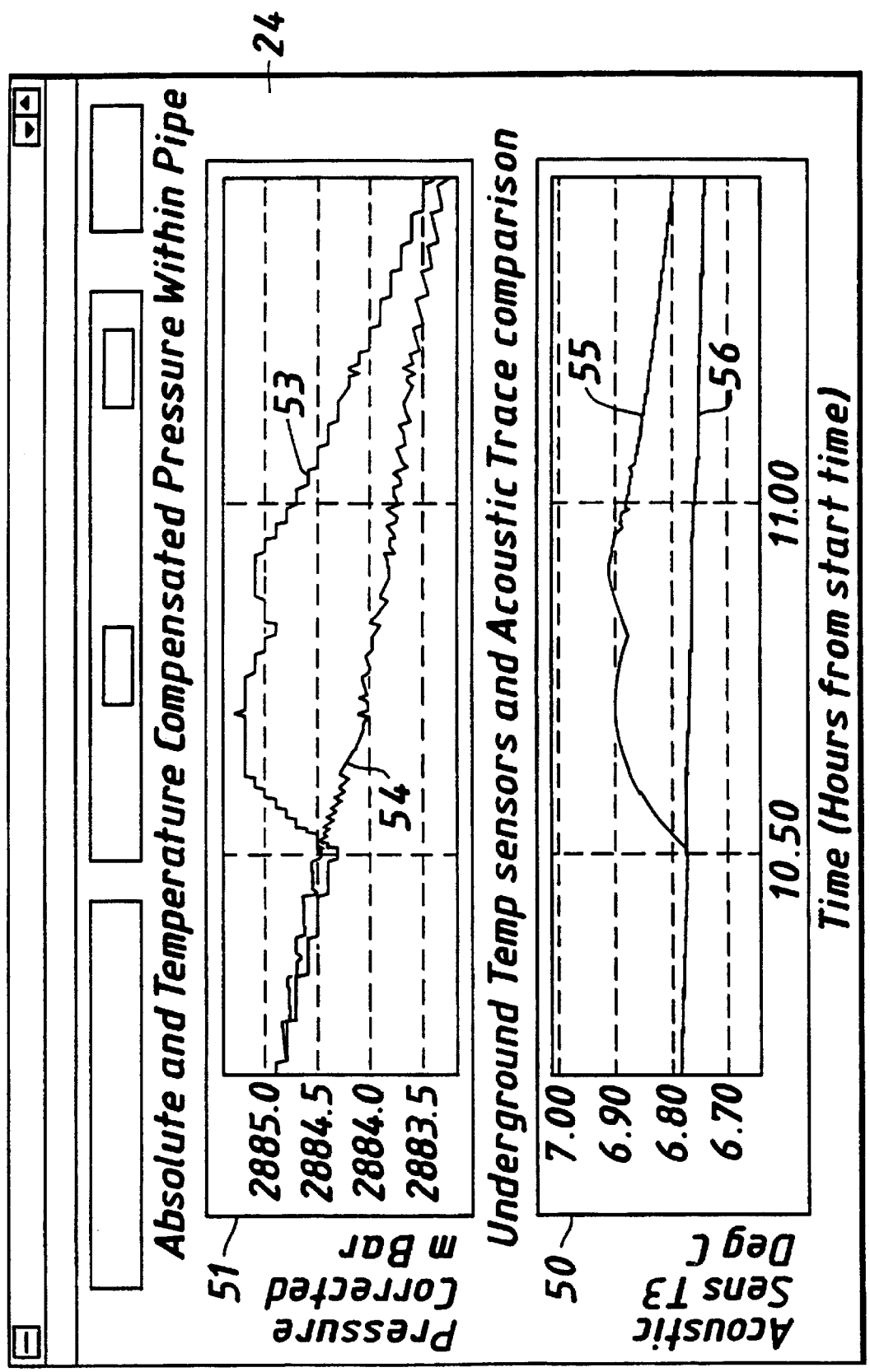
FIG. 5 shows temperature and pressure graphs associated with the measurements.

Software cursors 42 and 43 can be moved to manually select the waveform portions for processing to determine temperature values so that only these windows are utilised for calculation to prevent false readings As part of the display the text portion 39 can display input parameters such as pipe length (e.g. 20 m), frequency selected (e.g. 400 Hz) and number of cycles in burst (e.g. 5). The calculations give values for the time of the initial burst and echo and the time between the cursors (e.g. 120.17 m/second). The completed results are displayed on screen 24 as shown in FIG. 5.

The screen display includes lower portion 50 showing temperature in ° Celsius against time shown in hours.

The upper portion 51 shows pressure in milliBars against time in hours. The acoustically measured temperature is shown in waveform 55. For comparison purposes ground temperature in the region of the pipe is measured by a separate transducer (not shown) to provide the reference graph 56.

It can be seen that, in this example, the two temperature graphs 55 and 56 are identical up to the time of 10.50 hours from start time. At that point in time an artificial heat source was applied to the pipe to cause an elevated temperature (for experimental reasons) to occur. It is seen from the upper portion 51 that the absolute pressure 53, as measured by the pressure transducer 14, also rises at the same time, thus giving a false reading which could mask an actual leak.

However, the corrected pressure 54 provides a waveform that shows only the isothermal pressure which is not influenced by temperature and only changes if there is a leak. In this case a small leak has been determined to exist as indicated on the graph by the falling pressure from about 2885 to 2883 mBar in the period of measurement displayed.

The corrected pressure is determined from the equation $$P_{corrected} = P_{actual} \times \frac{T_{initial}}{T_{actual}}$$

Although the system has been described in terms of a personal computer based arrangement with an associated DSP board, in an alternative arrangement, a rugged laptop could be used with a PMCIA card for the A/D and D/A conversions.

Under certain operational conditions it may be appropriate to have a base station continuously present in a trench for logging data over an extended timescale and having an interface (e.g. non-contacting) to allow uploading of this data to a host laptop computer when an engineer visits the site.

What is claimed is:
1. A fluid temperature measurement system comprising
   transducer means for generating an acoustic signal for passage through the fluid;
   detector means for detecting a first signal at a first point in the passage of the acoustic signal;
   detector means for detecting a second signal at a second point in the passage of the acoustic signal; and processor means for calculating temperature as a result of information derived from the first and second detected signals, wherein generator means are provided to generate a tone burst signal at a selected frequency for use by the transducer means.

2. A system as claimed in claim 1 wherein a single detector detects both the first and second acoustic signals and the processor means is configured to determine temperature from the relative phase between the first and second signals.

3. A system as claimed in claim 1 wherein the detector is configured to detect the second signal resulting from an echo from a distant point in the fluid.

4. A system as claimed in claim 1 wherein the processor means includes a fast fourier transform analyser.

5. A system as claimed in claim 1 wherein the frequency is selected to be no greater than 1 KHz.

6. A system as claimed in claim 1 wherein the signal detected by the detector means is in the form of an analog voltage and converter means are provided to convert the signal into digital form for use by the processor means.

7. A system as claimed in claim 1 wherein display means are provided to display signal information derived from the first and second acoustic signals.

8. A system as claimed claim 1 including pressure sensing means for detecting pressurised fluid in a chamber through which the acoustic signal passes and means for modifying the measured pressure in dependence on the calculated temperature to give a pressure value corrected for temperature effects.

9. A system as claimed in claim 8 wherein the chamber is a pipeline terminated at each end and pressure input means are provided to pressurise the pipeline to a desired pressure level.

10. A system as claimed in claim 8 including storage means for storing pressure readings over an extended time period.

11. A system as claimed in claim 10 including display means for displaying measured pressure and/or corrected pressure measurements over at least part of the extended time period.

12. A method of temperature measurement in a fluid comprising generating an acoustic signal for passage through the fluid; said method including the steps for:

detecting a first signal at a first point in the passage of the acoustic signal;

detecting a second signal at a second point in the passage of the acoustic signal; and calculating temperature as a result of information derived from the first and second detected signals;

and including the step of generating a tone blast signal at a selected frequency for providing the acoustic signal.

13. A method as claimed in claim 12 wherein the temperature is determined from the relative phase between the first and second signals.

14. A method as claimed in claim 12 wherein the second signal is detected as a result of an echo from a distant point in the fluid.

15. A method as claimed in claim 12 wherein the signal is detected in the form of an analog voltage and includes the step of converting the signal into digital form.

16. A method as claimed in claim 12 including the step of displaying signal information derived from the first and second acoustic signals.

17. A method as claimed in claim 12 including the steps of detecting pressurised fluid in a chamber through which the acoustic signal passes and modifying the measured pressure in dependence on the calculated temperature to give a pressure value corrected for temperature effects.

18. A method as claimed in claim 17 including the step of pressurising the pipeline to a desired pressure level.

19. A method as claimed in claim 17 including the steps of storing pressure readings over an extended time period and displaying measured pressure and/or corrected pressure measurements over at least part of the extended time period.

* * * * *